Jan. 5, 1954
J. BOLSEY
2,664,798
CAMERA BODY CONSTRUCTION
Original Filed Oct. 11, 1947
3 Sheets-Sheet 1
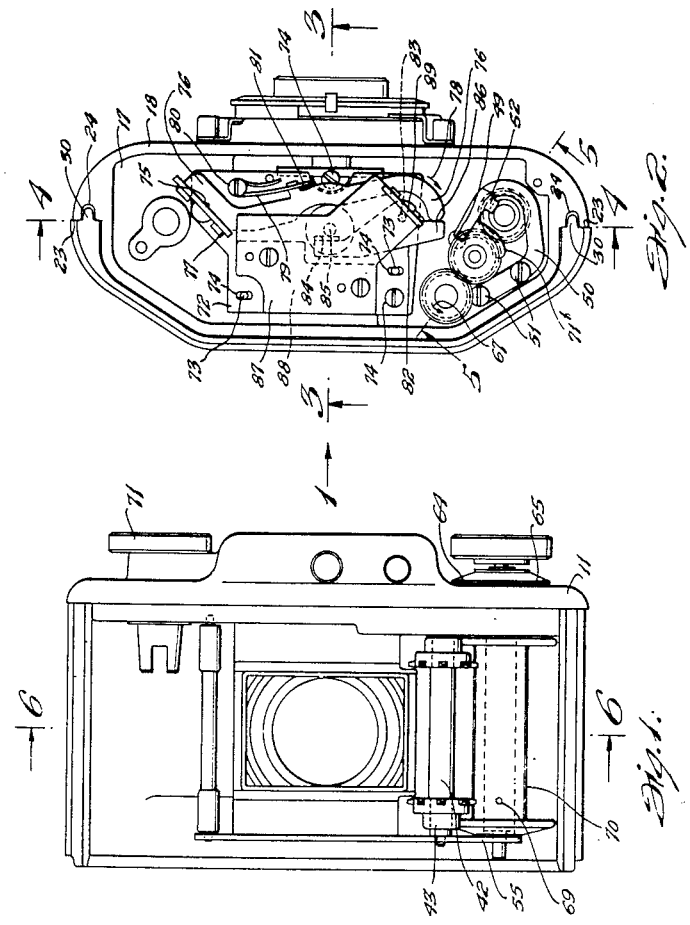
INVENTOR.
Jacques Bolsey
BY
Michael Stern Jan. 5, 1954
J. BOLSEY
2,664,798
CAMERA BODY CONSTRUCTION
Original Filed Oct. 11, 1947
3 Sheets-Sheet 2
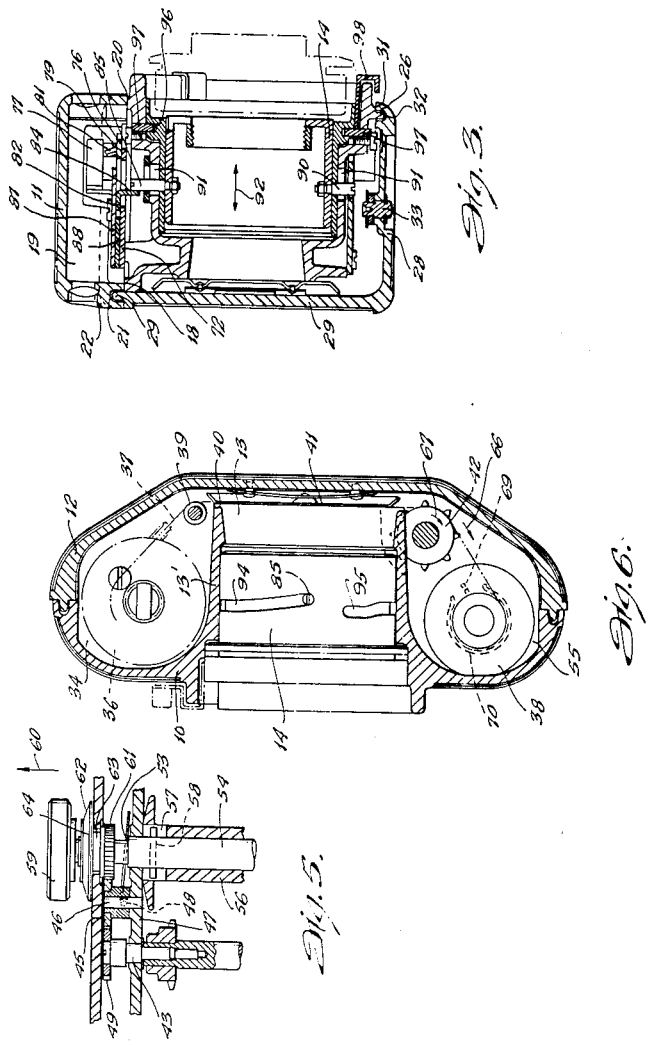
INVENTOR.
Jacques Bolsey
BY Jan. 5, 1954  J. BOLSEY  2,664,798
CAMERA BODY CONSTRUCTION
Original Filed Oct. 11, 1947  3 Sheets-Sheet 3
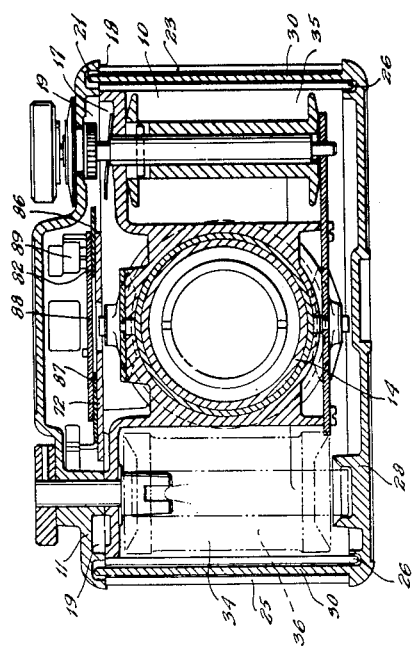
INVENTOR.

Patented Jan. 5, 1954

2,664,798

UNITED STATES PATENT OFFICE 2,664,798

CAMERA BODY CONSTRUCTION

Jacques Bolsey, New York, N. Y.

Continuation of application Serial No. 779,301, October 11, 1947. This application October 5, 1948, Serial No. 52,929

2 Claims. (Cl. 95—31)

My present invention relates to photographic cameras, and more particularly to the general construction of such cameras.

It is an object of my present invention to provide a photographic camera which is easy to manufacture and simple to use and nevertheless adapted for taking pictures of high quality.

It is another object of my present invention to provide a camera construction which is absolutely light-tight.

With the above objects in view, a photographic camera according to my present invention comprises in combination a camera body having a top, a rear and a bottom face, an objective lens and focusing means arranged in the front part of the camera body, film transporting and guiding elements arranged in the rear part of the camera body, a camera top fitting upon the top face of the camera body so as to form a compartment between its inner face and the top face of the camera body, means for operating the film transporting and guiding elements arranged within the compartment and operatively connected with the film transporting and guiding elements arranged in the rear part of the camera body, a removable camera cover adapted to cover the rear and bottom faces of the camera body, and light excluding means arranged along the edges of the removable camera cover between the same and the camera body.

A particularly preferred camera construction according to my present invention includes in combination a camera body having a top face, a rear face having two lateral edges, and a bottom face having a front edge, an objective lens and focusing means arranged in the front part of the camera body, film transporting and guiding elements arranged in the rear part of the camera body, longitudinal projecting rims arranged along the lateral edges of the rear face of the camera body, a longitudinal projecting rim arranged along the front edge of the bottom face of the camera body, a camera top having a rear edge and fitting upon the top face of the camera body so as to form a compartment between the inner face of the camera top and the top face of the camera body, means for operating the film transporting and guiding elements arranged within the compartment and operatively connected with the film transporting and guiding elements arranged in the rear part of the camera body, a range finder arranged also within the compartment and operatively connected with the objective lens, a removable combined rear and bottom camera cover having a rear portion with a top and two lateral edges and a bottom portion with a front edge and adapted to cover said rear face and the bottom face of the camera body, longitudinal grooves arranged along the lateral edges of the rear portion of the camera cover cooperating with the longitudinal projecting rims arranged along the lateral edges of the rear face of the camera body, a longitudinal projecting rim arranged along the top edge of the rear portion of the camera cover cooperating with the longitudinal groove arranged along the rear edge of the camera top, and a longitudinal groove arranged along the front edge of the bottom portion of the removable camera cover cooperating with the longitudinal projecting rim arranged along the front edge of the bottom face of the camera body.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a rear view of my new camera with the cover removed, seen in direction of arrow 1 of Fig. 2;

Fig. 2 is a top view of the camera shown in Fig. 1 with the top member of the camera removed, seen in direction of arrow 2 of Fig. 1;

Fig. 3 is a cross section through the camera shown in Figs. 1 and 2, along line 3—3 of Fig. 2;

Fig. 4 is a longitudinal elevational section through the camera shown in Figs. 1 to 3, along line 4—4 of Fig. 2;

Fig. 5 is a fragmentary elevational section through the transporting and counter mechanism of the camera shown in Figs. 1 to 4, along line 5—5 of Fig. 2; and Fig. 6 is a longitudinal plane section through the camera shown in Figs. 1 to 4, along line 6—6 of Fig. 1.

My new camera contains as main elements a camera body 10, a camera top 11 and a detachable camera cover 12.

The camera body 10 is provided with a central cylindrical compartment 13 into which fits the lens barrel 14 carrying in usual manner the lens 15 and the shutter mechanism 16.

This camera body 10 is provided, as clearly shown in Figure 2, at its top, with a compartment 17 surrounded by the flat rim 18.

Furthermore, the camera body 10 is provided along its two lateral vertically extending edges 23 with U-shaped grooves 24, as shown in Figures 1 and 2. Finally, the camera body is also provided along its bottom edge 25 with a longitudinal projection 26 as shown in Figure 3.

The top member 11 mentioned above contains also a compartment 19 forming together with the compartment 17 in the camera body 10 a large combined compartment. Furthermore, the top member of the camera is provided along its front edge with a flat rim 20 having the same shape as the front portion of rim 18 and adapted to fit on the same. Along the rear edge of the top member 11 a U-shaped groove 21 is provided in the rim 22 of the same; this rim 22 is, as clearly shown in Figure 3, arranged so as to project rearwardly beyond the rear edge of rim 18 of the camera body 10.

The cover 12 is composed of a rear cover portion 27 and a bottom cover portion 28. The rear cover portion 27 is provided along its top edge with a longitudinal projection 29 adapted to fit into the corresponding U-shaped groove 21 of the top member 11, as clearly shown in Figure 3. Furthermore, the rear cover portion 27 of the cover member 11 is provided along its lateral vertically extending edges with two longitudinal projections 30 adapted to fit into the corresponding U-shaped grooves 24 provided along the lateral edges 23 of the camera body 10, as clearly shown in Figure 2. Finally, the bottom portion 28 of the cover 12 is provided along its front edge 31 with a U-shaped groove 32 into which fits the longitudinal projection 26 arranged along the bottom edge 25 of the camera body 10, as clearly shown in Figure 3.

The camera cover 12 is secured to the camera in proper operative position covering the rear and bottom of the camera body 10 by means of a turnable closure mechanism 33 of conventional type, whenever desired.

The camera body itself is provided not only with the cylindrical compartment 13 but also with two film compartments 34 and 35. Compartment 34 contains the film spool 36 from which the film strip 37 is unwound and compartment 35 contains the take-up spool 38, upon which the film strip 37 is wound during its transportation.

During such film transportation, the film strip passes over the guiding roller 39, between the rear exposure face 40 of the camera body 10 and the pressure plate 41 of conventional design mounted on the camera cover 12, and engages before reaching the take-up spool 38 the film sprocket 42, as clearly shown in Figure 6.

This film sprocket 42 is carried by the shaft 43 freely rotatably mounted as shown in Figures 1 and 5, in openings provided in the horizontal partition wall 47 and the bottom wall 55 of the camera body 10. As shown in Figure 5, shaft 43 carries at its top end the pinion 44. This pinion 44 is in mesh with the idler pinion 45 carried by the pinion shaft 46 freely rotatably mounted on the horizontal partition wall 47 of the camera body 10. The pinion shaft 46, in turn, carries a stopping pin 48 adapted to turn together with shaft 46.

The stopping pin 48 is arranged so as to abut, as shown in Figures 2 and 5, against the end face 49 of the spring member 50 secured by means of screws 51 to the horizontal partition wall 47 of the camera body 10.

This spring 50 is provided with a projecting portion 52 engaging the annular face 53 formed on shaft 54. This shaft 54 is mounted freely turnably and slidably in axial direction in corresponding openings provided in the horizontal partition wall 47 and bottom wall 55 of the camera body 10, and carries the take-up spool 56. This take-up spool 56 is provided with longitudinal cut-outs 57 into which projects the pin 58 secured to shaft 54. This pin 58 makes it possible to turn the take-up spool 56 by turning shaft 54, independently of sliding movement of such shaft in axial direction.

Shaft 54 is extending, as clearly shown in Figure 5, at its upper end through a corresponding opening in the top member 11 and provided at its top with an operating film transporting knob 59. It is evident that by pulling knob 59 in direction of arrow 60 it is possible to bend the blocking spring 50 upwards so as to move its end face 49 out of the path of the stopping pin 48.

Shaft 54 carries also a counter pinion 61 constructed so as to have one gear tooth less than pinion 45. This pinion 61 is freely turnably and slidably mounted on shaft 54 and in no way connected with the same so as to engage permanently, i. e. also during sliding of the shaft, the pinion 45 and to be turned by the same.

Finally, the transporting and counter-mechanism of my camera includes also a counter-disc 62 freely turnably carried by shaft 54 but connected by means of a friction coupling 63 of conventional design with the pinion 61 so as to turn together with the latter. This counter-disc 62 is provided with an indicating arrow 64 cooperating with a scale 65 arranged on the upper face of top member 11 around the counter-disc 62 and adapted to indicate the number of exposed pictures.

My new combined film transporting and counting mechanism operates as follows:

The film strip 37 is inserted, as shown in Figure 6, engaging sprocket 42. If it is desired to transport the film strip 37, it is only necessary to turn knob 59 so as to pull the film in direction of arrow 66. Movement of the film strip 37 in direction of arrow 66 will result in turning of sprocket 42 in direction of arrow 67 which, in turn, will result in turning of the pinion 45, shaft 46 and stopping pin 48 in direction of arrow 68. During turning in direction of arrow 68, the stopping pin 48 will abut against the end face 49 of spring 50 and thereby stop further turning of pinion 45, pinion 44 and sprocket 42, thus preventing further transportation of the film strip 37.

In this position the film strip 37 is ready for taking a picture. After taking of the picture, it is necessary to enable further transportation of the film. This is done by pulling knob 59 in direction of arrow 60. This will result in lifting of spring 50 and disengagement of the end face 49 of the same and the stopping pin 48.

During such disengagement, the stopping pin 48 will automatically turn a small distance in direction of arrow 68, thereby moving under or beyond the end face 49 of the spring 50. This automatic turning movement of the stopping pin is, as I have found, due to the fact that the film strip between the take-up spool 38 and sprocket 42 is under a slight tension while 42 is prevented from turning. The moment the stopping pin 48 is released, the film strip 37 under tension turns the sprocket 42 which results in turning of the pin 48 under or beyond the end face 49 of spring 50.

The knob 59 is then released and is forced by spring 50 to return into its original position. In the meantime, as set forth above, the stopping pin 48 has moved under or beyond the end face 49 of spring 50 and is able to freely turn in direction of arrow 68 until it hits again against the end face 49 of the spring 50. Such turning of pin 48 is accomplished by turning of knob 59 which will, of course, also result in turning of the take-up spool 54 and transportation of a predetermined length of film strip into exposure position.

Thus, in order to transport consecutive film portions of predetermined length, it is each time only necessary to turn knob 59 until such turning is blocked, then to pull it in direction of arrow 60, to release it and to turn it again.

The counter mechanism connected with the above described transportation mechanism automatically indicates the number of film portions which have been transported: This is due to the fact that during each film transporting cycle the pinion 45 turns 360° resulting in turning of pinion 61 about an angle which is slightly smaller than a complete circle. By properly arranging the lines of scale 65, it is possible to obtain by means of the indicating arrow 64 proper indication of the number of transported film portions.

The friction coupling 63 mentioned above connecting the pinion 61 with indicating disc 62 makes it possible to turn the indicating disc 62 back into its initial position at the start of operation, i. e. after insertion of a new film strip when the same is ready for taking the first picture.

In order to facilitate insertion of the film strip 37 and its proper and easy attachment to the take-up spool 54, I provide on the outer surface of this spool a sprocket pin 69 arranged so as to be adapted to engage one of the sprocket holes of the film strip. Furthermore, I secure to the take-up spool 54 a substantially cylindrical spring member 70 serving for guiding the film. I have found that if the end of the film strip is pushed under this spring member so as to be temporarily held by the same, and the take-up spool is turned, the pin 69 will enter one of the sprocket holes of the film and firmly hold the film strip.

I wish to mention that in order to enable uninterrupted rewinding of the film, i. e. transportation of the film from the take-up spool 38 upon the film spool 36 by turning knob 71, the spring 50 is bent so as not to block continuous turning of pin 48 when the same is turned against direction of arrow 68. This purpose is attained by providing a sloping extension 71' on spring 50 the end of which reaches under the path of pin 48 so that the entire spring together with the end face 49 thereof is depressed and sliding under the pin 48 without blocking the same when the pin is turned against direction of arrow 68 by rewinding of the film strip as set forth above.

My camera is equipped with a range finder arrangement of entirely new type. This range finder arrangement is a separate unit and is mounted on a base plate 72. This base plate 72, in turn, is mounted on the bottom of the compartment 17 formed within the top surface of the camera body 10. In order to enable adjustment of the entire range finder, I provide adjusting pins 73 forming part of the camera body and sliding in longitudinal slots 74 provided in the base plate 72. The screws 74 serve for securing the base plate 72 to the camera body in adjusted position. On this base plate 72, I pivot by means of the pivot 75 the flat lever 76 carrying the turnable range finder mirror 77. This lever 76 is permanently forced to turn in direction of arrow 78 by the leaf spring 79 secured by means of screw 80 to the base plate 72 and abutting against the upwardly bent portion 81 of lever 76.

Furthermore, I mount the operating lever 82 by means of the pivot 83 on the base plate 72. This operating lever 82 is engaging by means of its downwardly bent portion 84 the pin 85 mounted on the lens barrel 14 so as to be adapted to be turned about pivot 83 by movement of this pin. At its other end 86, the operating lever 82 is contacting the end of the lever 76 and turning the same so as to adjust the position of mirror 77.

My new range finder unit also includes a stationary top plate 87 held by the spacing plate 88 at a slight distance from the base plate 72 so as to serve as guide for the two levers 76 and 82. This top plate 87 also carries the stationary mirror 89.

My new range finder constructed and arranged as described above, consists of very few parts, is extremely simple to install and adjust and is very reliable in operation.

My new camera is also equipped with an entirely new type of lens mount and means for operating the range finder:

The lens 15 together with the shutter mechanism 16 is carried by the lens barrel 14 which is provided with two radially extending pins 90 and 85. Pin 85 is relatively long and engages, as set forth above and clearly shown in Figure 3, the downwardly bent portion 84 of the operating lever 82 forming part of the range finder arrangement described above.

The pins 85 and 90 are passing through and are guided by longitudinal slots 91 provided in the cylindrical portion 13' of the camera body 10 surrounding the lens barrel 14. Thus, the lens barrel 14 is prevented from turning but able to slide in direction of the optical axis of the camera as indicated by arrow 92.

Between the inner cylindrical surface of the cylindrical body portion 13' and the lens barrel 14, I arrange a cylindrical guiding sleeve 93 provided with two helical slots 94 and 95 through which are passing the pins 85 and 90, respectively. This cylindrical guiding sleeve 93 is provided with an annular slot 96 into which project the guide plates 97 secured to the camera body 10. These guide plates 97 prevent movement of the cylindrical guiding sleeve 93 in axial direction as indicated by arrow 92, while permitting its turning about the optical axis of the lens.

At the front edge of the cylindrical guiding sleeve 93 described above, I provide a focusing lever 98. By turning of this focusing lever 98 it is possible to turn the guiding sleeve 93. Such turning movement of the guiding sleeve 93 will be transmitted by means of the helical slots 94 and pins 85 and 90 to the lens barrel 14 resulting in sliding of the same in axial direction. During such sliding movement of the lens barrel 14, the pin 85 secured thereto will operate the range finder as described above.

It will be understood that each of the elements described above, or two or more together, may also find a useful application in other types of photographic cameras, differing from the types described above.

While I have illustrated and described the invention as embodied in photographic cameras using perforated film strips, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

This is a continuing application of application Serial No. 779,301, filed October 11, 1947, now Patent No. 2,508,095, issued May 16, 1950.

What I claim as new and desire to secure by Letters Patent is:

1. In a photographic camera in combination, a camera body having a top face, a rear face having two lateral edges, and a bottom face having a front edge; an objective lens and focusing means arranged in the front part of said camera body; film transporting and guiding elements arranged in the rear part of said camera body; longitudinal grooves arranged along said lateral edges of said rear face of said camera body; a longitudinal projecting rim arranged along said front edge of said bottom face of said camera body; a camera top having a rear edge and fitting upon said top face of said camera body so as to form a compartment between the inner face of said camera top and said top face of said camera body; means for operating said film transporting and guiding elements arranged within said compartment and operatively connected with said film transporting and guiding elements arranged in the rear part of said camera body; a range finder arranged also within said compartment and operatively connected with said objective lens; a longitudinal groove arranged along the rear edge of said camera top; a removable combined rear and bottom camera cover having a rear portion with a top and two lateral edges and a bottom portion with a front edge and adapted to cover said rear face and said bottom face of said camera body; longitudinal projecting rims arranged along said lateral edges of said rear portion of said camera cover cooperating with said longitudinal grooves arranged along said lateral edges of said rear face of said camera body; a longitudinal projecting rim arranged along said top edge of said rear portion of said camera cover cooperating with said longitudinal groove arranged along said rear edge of said camera top; and a longitudinal groove arranged along said front edge of said bottom portion of said removable camera cover cooperating with said longitudinal projecting rim arranged along said front edge of said bottom face of said camera body.

2. In a photographic camera, in combination, a camera body having a top face, a rear face having two lateral edges, and a bottom face having a front edge; an objective lens and focusing means arranged in the front part of said camera body; film transporting and guiding elements arranged in the rear part of said camera body; longitudinal grooves arranged along said lateral edges of said rear face of said camera body; a longitudinal projecting rim arranged along said front edge of said bottom face of said camera body; a camera top having a rear edge and fitting upon said top face of said camera body so as to form a compartment between the inner face of said camera top and said top face of said camera body and to project slightly rearwardly along the rear edge of said top face of said camera body; means for operating said film transporting and guiding elements arranged within said compartment and operatively connected with said film transporting and guiding elements arranged in the rear part of said camera body; a range finder arranged also within said compartment and operatively connected with said objective lens; a longitudinal groove arranged along the rear edge of said rearwardly projecting portion of said camera top; a removable combined rear and bottom camera cover having a rear portion with a top and two lateral edges and a bottom portion with a front edge adapted to cover said rear face and said bottom face of said camera body; longitudinal projecting rims arranged along said lateral edges of said rear portion of said camera cover cooperating with said longitudinal grooves arranged along said lateral edges of said rear face of said camera body; a longitudinal projecting rim arranged along said top edge of said rear portion of said camera cover cooperating with said longitudinal groove arranged along said rear edge of said camera top; and a longitudinal groove arranged along said front edge of said bottom portion of said removable camera cover cooperating with said longitudinal projecting rim arranged along said front edge of said bottom face of said camera body.

JACQUES BOLSEY.

References Cited in the file of this patent

UNITED STATES PATENTS

| Number | Name | Date |
|---|---|---|
| 2,105,256 | Mihalyi | Jan. 11, 1938 |
| 2,153,813 | Pritschow | Apr. 11, 1939 |
| 2,172,337 | Mihalyi | Sept. 5, 1939 |
| 2,231,731 | Mihalyi | Feb. 11, 1941 |
| 2,358,327 | Harris | Sept. 19, 1944 |
| 2,378,406 | Harris | June 19, 1945 |

FOREIGN PATENTS

| Number | Country | Date |
|---|---|---|
| 488,934 | Great Britain | July 15, 1938 |
| 524,649 | Great Britain | Aug. 12, 1940 |
| 563,305 | Great Britain | Aug. 9, 1944 |